Feb. 24, 1959  J. DONNAY  2,875,276
TELEVISION CAMERA EQUIPMENTS
Filed March 26, 1952
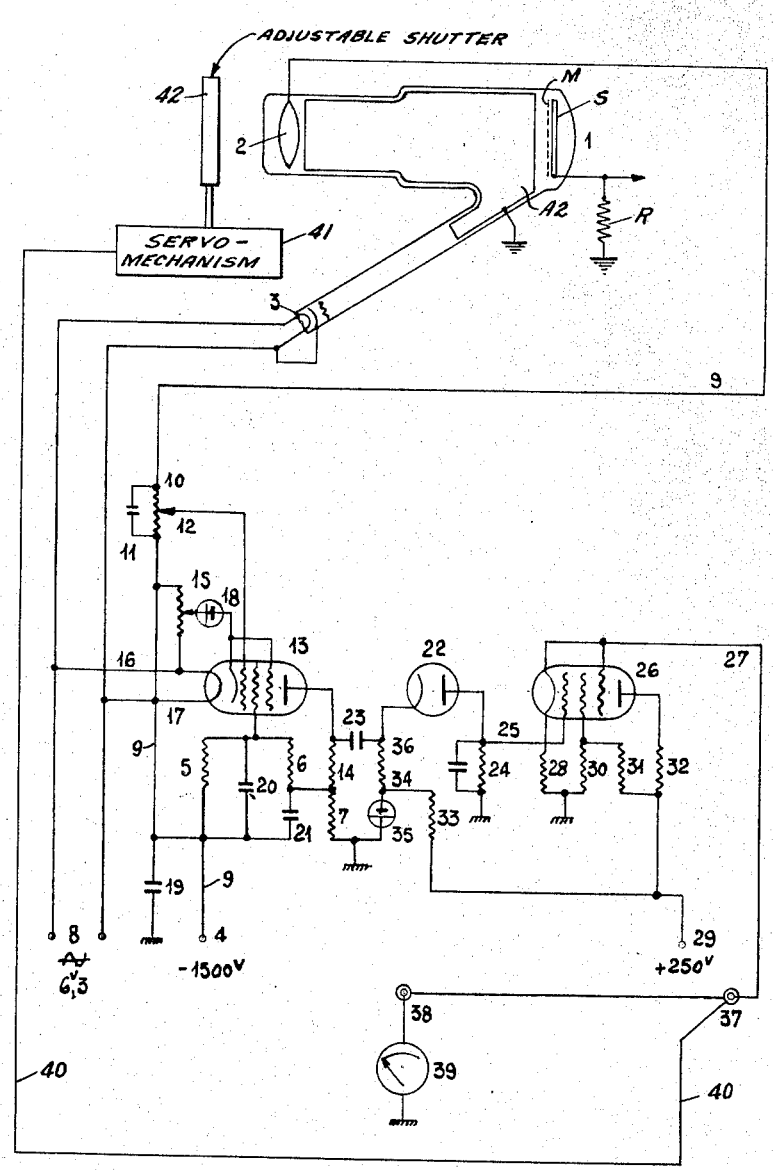
INVENTOR
Jacques Donnay
By Ralph B. Stewart
Attorney

2,875,276

TELEVISION CAMERA EQUIPMENTS

Jacques Donnay, Paris, France, assignor to Societe Nouvelle de l'Outillage R. B. V. et de la Radio-Industrie (R. B. V.-R. I.), Paris, France, a joint-stock company Application March 26, 1952, Serial No. 278,577

Claims priority, application France March 31, 1951

9 Claims. (Cl. 178—7.2)

The present invention relates to improvements in television camera equipments which comprise an analyzer tube the photocathode of which receives the light flow from the picture through an optical system including an adjustable diaphragm or shutter, and receives a high negative bias potential—of the order of a thousand volts, for instance—as is the case of an analyzer tube of the supericonoscope kind, wherein, further, said photocathode is structurally distinct and electrically separated from the so-called "mosaic" electrode plate which is scanned by a cathode ray according to a television raster for the generation of the issuing television video signal.

An object of the invention is to provide therein means for checking and/or controlling the intensity of the light flow through said adjustable shutter to said photocathode.

A further object of the invention is to provide such checking means so as to give a continuous and accurate measurement of the intensity of said light flow.

Another object of the invention is to provide such means so as to supply a permanent or continuous D. C. signal voltage to be applied to an electric meter and/or an electromechanical control device of said adjustable shutter.

A further object of the invention is to provide such means that are suitable for use on analyser tubes in which said photocathode receives a high negative bias potential.

According to a feature of the invention, there are provided, in a television camera equipment of the kind hereinabove specified, means for deriving from said photocathode a permanent or continuous voltage measuring the mean value of said light flow and for applying said voltage to a D. C. electronic voltmeter.

According to a further feature of the invention, there are provided, in a television camera equipment of the kind specified, means for deriving from said photocathode a continuous voltage measuring said light flow, means for modulating an A. C. continuous wave by said continuous voltage, and means, including an electronic peak voltmeter, for deriving from said modulated A. C. wave a D. C. voltage measuring the R. M. S. voltage value of said modulated A. C. wave.

According to a further feature of the invention, said modulating means are so balanced as to discriminate against the high negative D. C. bias voltage forming part of the continuous voltage derived from the photocathode.

These and further features will be more fully described with respect to an illustrative embodiment shown in the attached drawing. In said drawing, the analyser tube referred to is of conventional construction and is shown diagrammatically at 1. This tube is of the supericonoscope type and includes a photocathode 2 arranged to receive the light image of the picture to be analysed, the heater 3 of the electron gun, the target of the electron gun formed of a signal plate S carrying on its front face a mosaic M, and the second anode A2 for the electron gun which also serves as an accelerating electrode for the electrons emitted by photocathode 2. The output signal is taken from signal plate S across coupling resistor R and supplied to the usual video amplifier, not shown. Illustratively, it may be supposed that said photocathode 2 and said heater 3 are given, through connection 9 from terminal 4, a high negative bias voltage of −1500 volts with respect to ground. From said terminal 4, further, such series resistors as 5—6—7 are shown, which are included in a voltage divider such as usually used for the supply of all bias voltages required for the operation of an analyser tube. As indicated, resistor 7 forms the grounded end of said voltage divider.

From its input terminals 8, the heater 3 of the analyser tube receives an A. C. supply voltage of suitable value, for instance 6.3 volts, and of a low frequency such as the mains supply frequency, for instance 50 cycles per second. According to a subsidiary feature of the invention, said A. C. voltage will be used as the carrier voltage for the concerned photometric arrangement for measuring the light flow received by the photocathode.

The photocathode 2 receives the negative voltage applied at terminal 4 through a lead or conductor 9 in which is inserted a series resistor 10, by-passed by a decoupling condenser 11. Said series resistor 10 is made adjustable in order to provide a sensitivity control, or accuracy control, of the take-off of the photoelectric voltage established across it through lead 9. Said photoelectric voltage is supplied from adjustable tap 12 on said resistor 10 to the control grid of a vacuum tube 13, for instance a pentode tube. The screen-grid bias voltage for said tube 13 is taken off from the connection point between resistors 5 and 6, and its plate receives through a resistor 14, the bias voltage value at the junction between resistors 6 and 7. Said resistor 14 constitutes the load impedance of tube 13. Both the cathode and the suppressor grid of said tube are connected to the tap of a balance potentiometer 15, through a cathode bias such as the battery indicated at 18. The potentiometer 15 is connected at one end to conductor 16 supplying the A. C. 50 C. P. S. voltage to the heater of the cathode of the tube 13, and the other end is connected through lead 9 to the other heater supply conductor 17. By such an arrangement, the high negative D. C. bias voltage from 4 is simultaneously applied to the heater, the cathode and the control grid of tube 13 and, further, said cathode receives from potentiometer 15 the 50 C. P. S. voltage which serves as a carrier. The plate output voltage from tube 13 will then be the 50 C. P. S. carrier which is amplitude-modulated by the varying voltage of the control grid, viz. by the photoelectrically generated varying voltage from the photocathode 2 of the analyser tube, the level or value of which gives a measure of the mean value of the light flow received on said photocathode, the mean value of the light flow varying in accordance with the picture optically projected onto it.

At 19, 20 and 21 are shown condensers decoupling or by-passing to ground the low frequency A. C. component which should not appear in its unmodulated form in the output of tube 13. It may be noted that 19 is the usual output condenser from the smoothing filter in the voltage divider of the high D. C. voltage for the analyser tube.

Now the metering circuit proper comprises a peak voltmeter comprising a diode 22 which receives on its cathode the modulated carrier voltage from tube 13 through the capacitive coupling 23 and which includes in its plate output circuit the parallel resistance-capacitance network 24 acting as a voltage integrating circuit. The plate lead 25 from said diode is connected to the control grid of a D. C. amplifier tube 26, which receives on said control grid the D. C. voltage developed across the integrating network 24 and representing the R. M. S. value of the amplitude-modulated wave applied to the cathode of diode 22. The amplifier tube 26 is connected as a cathode-follower stage, having its output lead 27 taken off across a load resistor 28 inserted between cathode and ground. Usual bias voltages for the screen grid and plate of said tube 26 are taken from terminal 29 receiving the normal high battery voltage, for instance of 250 volts, on the resistance voltage divider 30—31—32.

From said terminal 29, the battery voltage is also applied through a series resistor 33 to the cathode biasing circuit of the diode 22. Point 34 is connected to the cathode of the diode 22 through a bias resistor 36 and receives both the battery voltage from 29 and the low value bias voltage of a small battery 35 which is permanently maintained charged from the current flowing through it from terminal 29 to ground.

At the output terminal 37 of the described arrangement, there appears a D. C. voltage the value of which varies in accordance with the light flow picked-up on the photocathode of the analyser tube 1. Such a continuous D. C. measurement voltage may be applied, as shown, on a voltmeter 39 through its input terminal 38. Said terminal 37 may also be connected to the supply input of any adjusting or regulating device for controlling the opening of the shutter included in the optical system projecting the light flow from the picture to the photocathode 2 of the analyser tube. Such a shutter and such a control device are sufficiently known per se as to be shown and described only broadly: for instance, the output voltage from 37 may be applied through connection 40 to a servo-mechanism 41 where it varies the current feed of a small D. C. motor controlling the width of aperture of an adjustable shutter 42 cooperating with a lens of a camera optical system, said D. C. voltage being compared to or balanced against a voltage from a potentiometer having its slider position controlled by said motor, as in a conventional positioning servo-mechanism.

It is however apparent that, from the continuous indication from the meter 39, a manual adjustment of the aperture of a shutter may be made by an operator of the television camera equipment.

From the foregoing description it will be understood that the current flowing through connection 9 from high voltage terminal 4 to the photocathode 2 varies in amplitude according to the mean value of the light falling upon the entire area of the photocathode, so that the current to the photocathode varies in amplitude in accordance with variations in the light content of the picture to be analysed. Likewise, the continuous voltage developed across resistor 10 in connection 9 and applied to the modulator tube 13 varies in value in accordance with the variations in the mean value of the light falling upon the entire active area of the photocathode 2, and the carrier current output of modulator 13 varies in amplitude in the same manner. It will be noted also that while the modulator tube 13 is energized at high voltage from the terminal 4, the high voltage is prevented from reaching the indicating and controlling devices by the use of condenser 23 to provide a capacitive coupling for supplying the modulated carrier current from modulator 13 to the rectifying diode 22. The continuous voltage developed across the network 24 in the circuit of diode 22 varies in amplitude in the same manner as the voltage developed across resistor 10 and applied to the input of modulator 13. This voltage is amplified by the amplifier 26 and is then employed to operate voltmeter 39 and the servo-mechanism 41. The elements 22 and 26 are energized from a source of current of relatively low voltage applied at the terminal 29.

What I claim is:

1. In a television camera equipment comprising an analyser tube having a mosaic screen and a separate photocathode which receives the light flow from the picture to be analysed, means for deriving from said photocathode a continuous voltage proportional to the mean value of the light falling on the entire active area of said photocathode, modulating means controlled by said continuous voltage for modulating the amplitude of an alternating carrier voltage in accordance with variations of said continuous voltage, and means controlled by said modulated carrier voltage and producing a response proportional to the R. M. S. value of said modulated carrier voltage 2. In a television camera equipment comprising an analyser tube having a mosaic screen and a separate photocathode which receives the light flow from the picture to be analysed, means applying a high negative bias voltage to said cathode, means for deriving from said cathode a continuous voltage proportional to said light flow, alternating carrier-current modulating means, means for applying said continuous voltage together with said bias voltage on an input of said modulating means, and means for also applying said bias voltage together with an alternating carrier voltage on another input of said modulating means, and means controlled by said modulated carrier voltage and producing a response proportional to the R. M. S. value of said modulated carrier voltage.

3. In a television camera equipment comprising an analyser tube having an electron gun, a mosaic screen and a separate photocathode which receives the light flow from the picture to be analysed, means applying a high negative bias voltage to said photocathode and to the electron gun cathode and cathode heater, means for energizing said heater with a low frequency alternating current, means for deriving from said photocathode a continuous voltage proportional to said light flow, alternating current modulating means, means for applying said continuous voltage together with said bias voltage on an input of said modulating means, and means for applying said low frequency alternating current together with said bias voltage on another input of said modulating means, and means including a peak voltmeter for measuring the R. M. S. value of said modulated alternating current.

4. A photometric circuit arrangement for measuring the mean value of the light flow from a picture on the photocathode of an analyser tube, said photocathode and the cathode and cathode heater of said tube being supplied with a high bias voltage, comprising in combination a grid-controlled modulator tube having a cathode and a cathode heater, means for applying said bias voltage to the cathode, the cathode heater and the control grid of said modulator tube, means for aplpying an alternating low frequency voltage to said modulator cathode heater and means for applying part at least of said low frequency voltage to said modulator cathode, means for supplying part at least of the voltage from the photocathode to the control grid of said modulator tube, and indicating means responsive to the peak value of low frequency alternating current connected to the plate output of said modulator tube through a capacitive coupling.

5. A photometric circuit arrangement for measuring the mean value of the light flow from a picture on the photocathode of an analyser tube, said photocathode and the cathode and cathode heater of said tube being supplied with a high bias voltage, comprising in combination a grid-controlled modulator tube having a cathode and a cathode heater, means for applying said high bias voltage to the cathode, the cathode heater and the control grid of said modulator tube, means for applying a low frequency alternating voltage to said modulator cathode heater and means for applying an adjustable part of said alternating voltage to said modulator cathode, means for applying part at least of the photocathode voltage to the control grid of said modulator tube, a diode having its cathode connected through a capacitive coupling to the plate output of said modulator tube, and a plate circuit for said diode including an integrating network for deriving a continuous voltage of varying amplitude from the output of said modulator tube.

6. A photometric circuit arrangement for measuring the mean value of the light flow from a picture on the photocathode of an analyser tube, said photocathode and the cathode and cathode heater of said analyser tube being supplied with a high bias voltage through respective leads, the bias lead to said cathode and cathode heater being connected to one of a pair of leads supplying said cathode heater with a low frequency alternating voltage, comprising in combination a grid-controlled modulator tube having at least a plate, a control grid, a cathode and a cathode heater, said cathode heater of the modulator tube being supplied with an alternating voltage from said pair of leads, a series potentiometer in said photocathode biasing lead the tap of which is connected to said control grid, a shunt potentiometer connected across said pair of leads and having a tap connected to said modulator tube cathode, a diode having its cathode connected through a capacitive coupling to the plate output of said modulator tube, a plate circuit for said diode including an integrating network, and a direct connection from said integrating network to the control grid of a direct current amplifier tube, a cathode resistance load for said amplifier tube, and an electro-responsive device connected across said cathode resistance load.

7. In combination an analyser tube and a modulator tube, each having a cathode and a cathode heater, means supplying both cathode heaters and cathodes of said tubes with a high negative continuous voltage and means supplying both cathode heaters with an alternating low frequency voltage, a potentiometer supplied with said alternating voltage and having a tap connected through a self-polarizing cell to the cathode of said modulator tube, a photocathode in said analyser tube receiving the said high negative continuous voltage through a series potentiometer having a tap connected to the control grid of said modulator tube, a diode rectifier circuit fed by the modulated output of said modulator tube, a direct current amplifier fed by the output voltage of said rectifier circuit and producing a continuous output voltage which varies in value according to the voltage supplied to the grid of said modulator tube from said potentiometer.

8. In a television camera equipment including an analyser tube of the supericonoscope kind wherein a highly negative direct current potential is applied to the photocathode and to the cathode and cathode heater of the electron gun of the tube, a circuit arrangement for deriving a control voltage which varies in value according to changes in the intensity of the luminous flux which falls on said photocathode and comprising in combination, an impedance in the lead applying said highly negative potential to said photocathode, a tapping on said impedance, a modulator tube comprising at least a cathode and a cathode heater, a control grid and an anode, a connection from said tapping to the control grid of said tube, a potentiometer connected at one end to said lead and having a tapping connected to said cathode through a battery cell, the other end of said potentiometer being connected to one conductor of a pair supplying the heater of said cathode with an alternating low frequency voltage, the other conductor of said supply pair being connected to said highly negative potential lead, a diode rectifier circuit and a capacitive connection from the plate of said modulator tube to said rectifier circuit, and a direct current amplifier connected at the output of said rectifier for delivering a continuous voltage which varies in value according to variations in the mean value of the luminous flux received by the entire active area of said photocathode.

9. In a television camera equipment comprising an analyser tube having a mosaic screen and a separate photocathode which receives the light flow from the picture to be analyzed, a source of direct current of high voltage, a high-voltage connection from said source for applying a high negative voltage to said photocathode, a carrier-current modulator energized at high voltage from said source and producing an alternating carrier-current output, means controling said modulator by the current flowing in said connection to vary the amplitude of the output of said modulator according to variations in amplitude of the current flowing to said photocathode through said high-voltage connection, and means capacitively coupled to said modulator means and controlled by the modulated carrier-current output of said modulator for producing a continuous voltage which varies in value in accordance with the variations in amplitude of said carrier current.

References Cited in the file of this patent

UNITED STATES PATENTS

| | | |
|---|---|---|
| 2,133,882 | Zworykin | Oct. 18, 1938 |
| 2,412,424 | Rath | Dec. 10, 1946 |
| 2,421,476 | Belar et al. | June 3, 1947 |
| 2,431,824 | Poch | Dec. 2, 1947 |

FOREIGN PATENTS

| | | |
|---|---|---|
| 444,074 | Great Britain | Mar. 12, 1936 |